United States Patent Office.

WILLIBALD HENTSCHEL, OF RADEBEUL, GERMANY, ASSIGNOR TO CHEMISCHE FABRIK VON HEYDEN, ACTIENGESELLSCHAFT, OF RADEBEUL, NEAR DRESDEN, SAXONY, GERMANY.

PROCESS OF MAKING PHENYLGLYCIN.

SPECIFICATION forming part of Letters Patent No. 712,190, dated October 28, 1902.

Application filed May 26, 1902. Serial No. 109,075. (No specimens.)

*To all whom it may concern:*

Be it known that I, WILLIBALD HENTSCHEL, a subject of the Emperor of Russia, and a resident of Radebeul, near Dresden, in the Kingdom of Saxony, German Empire, have invented a new and useful Improvement in the Manufacture of Phenylglycin, of which the following is a specification.

This invention relates to a new and improved process for the manufacture of phenylglycin.

According to a method described in the *Berichte* XXII, page 1799, phenylglycin is produced by heating equal parts, by weight— that is, approximate equimolecular quantities—of anilin and monochloracetic acid with an excess of crystallized acetate of sodium and a small quantity of water. By this process a mixture is obtained of phenylglycin and phenyliminodiacetic acid—

which must be separated by an ether extraction. From twenty-five parts of anilin ten to twelve parts of phenylglycin are obtained.

According to my invention I have found that the formation of phenyliminodiacetic acid may be avoided and the yield of phenylglycin may be a threefold one—that is to say, from twenty-five parts of anilin thirty-six to thirty-eight parts of phenylglycin—if the two acids which originate or issue in the process—viz., the hydrochloric acid and the phenylglycin— are combined with the anilin, or, in other words, if instead of equimolecular quantities of anilin and monochloracetic acid being brought to react one molecule of monochloracetic acid is brought into reaction with three molecules of anilin or more, so that the reaction takes place according to the equation—

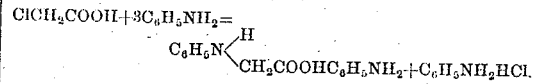

It is to be recommended that the reaction be allowed to take place in the presence of a diluting agent, among which agents alcohol, water, and mixtures of both, ether, ester, hydrocarbons, and anilin will be preferred.

Example: One hundred parts of monochloracetic acid are boiled for two hours under reflux with three hundred parts of anilin and two hundred parts of alcohol diluted with water in a digester provided with a stirrer. Afterward a lye is added till alkaline reaction takes place, and alcohol and anilin are expelled by the admission of steam. To this solution after it has been perfectly freed of anilin and has cooled down one hundred and twenty parts of a thirty-per-cent. hydrochloric acid are added, whereby the phenylglycin precipitates as a sandy powder.

What I claim as my invention is—

The herein-described process for the manufacture of phenylglycin which consists in reacting with one molecule of monochloracetic acid upon three or more molecules of anilin and separating the phenylglycin formed.

In testimony that I claim the foregoing as my invention I have signed my name, in presence of two witnesses, this 9th day of May, 1902.

WILLIBALD HENTSCHEL.

Witnesses:
HERNANDO DE SOTO,
CARL KNOOP.